(12) United States Patent
Osakabe

(10) Patent No.: US 7,539,088 B2
(45) Date of Patent: May 26, 2009

(54) OPTICAL DISC RECORDING AND REPRODUCING METHOD ADAPTIVE TO WOBBLE PREGROOVE

(75) Inventor: Katsuichi Osakabe, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 656 days.

(21) Appl. No.: 10/874,114

(22) Filed: Jun. 22, 2004

(65) Prior Publication Data

US 2005/0030844 A1 Feb. 10, 2005

(30) Foreign Application Priority Data

Jun. 23, 2003 (JP) .............................. 2003-177593
Mar. 4, 2004 (JP) .............................. 2004-059978

(51) Int. Cl.
*G11B 7/00* (2006.01)

(52) U.S. Cl. .................................. 369/44.13; 369/47.51

(58) Field of Classification Search ....................... None
See application file for complete search history.

(56) References Cited

U.S. PATENT DOCUMENTS 6,262,955 B1 * 7/2001 Kim ......................... 369/44.41
2001/0006502 A1 * 7/2001 Tsuyuguchi et al. ..... 369/53.36

FOREIGN PATENT DOCUMENTS

JP 2001-143386 5/2001

OTHER PUBLICATIONS

Japanese Patent Office: Notification of Reasons for Rejection, Appln. No. 2004-059978, dated Sep. 5, 2007.

* cited by examiner

*Primary Examiner*—Paul Huber
(74) *Attorney, Agent, or Firm*—Pillsbury Winthrop Shaw Pittman LLP

(57) ABSTRACT

An optical disc has a wobble pregroove which continues in a circumferential direction of the optical disc and wobbles in a radial direction of the optical disc such that the wobble pregroove meanders around a mean center line of meandering. Information recording process is performed by the steps of irradiating an optical beam along the wobble pregroove to form pits, thereby recording information in the form of the pits, and controlling the recording of the information in accordance with a radial distance of the wobble pregroove relative to the mean center line of meandering. Information reproducing process is performed by the steps of irradiating an optical beam along the wobble pregroove to optically detect pits which are formed along the wobble pregroove, thereby reproducing information in the form of the detected pits, and controlling the reproducing of the information in accordance with a radial distance of the wobble pregroove relative to the mean center line of meandering.

5 Claims, 13 Drawing Sheets

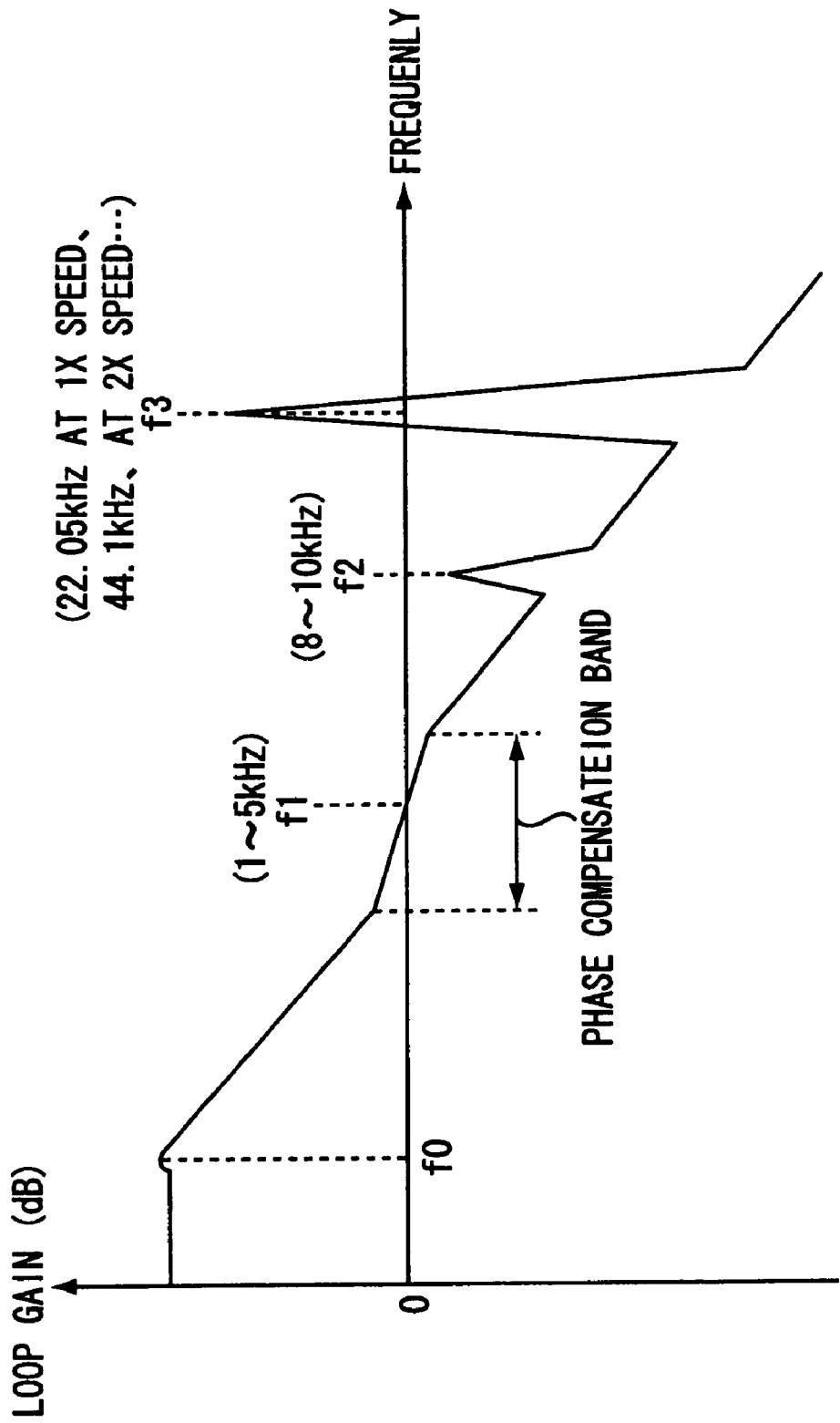

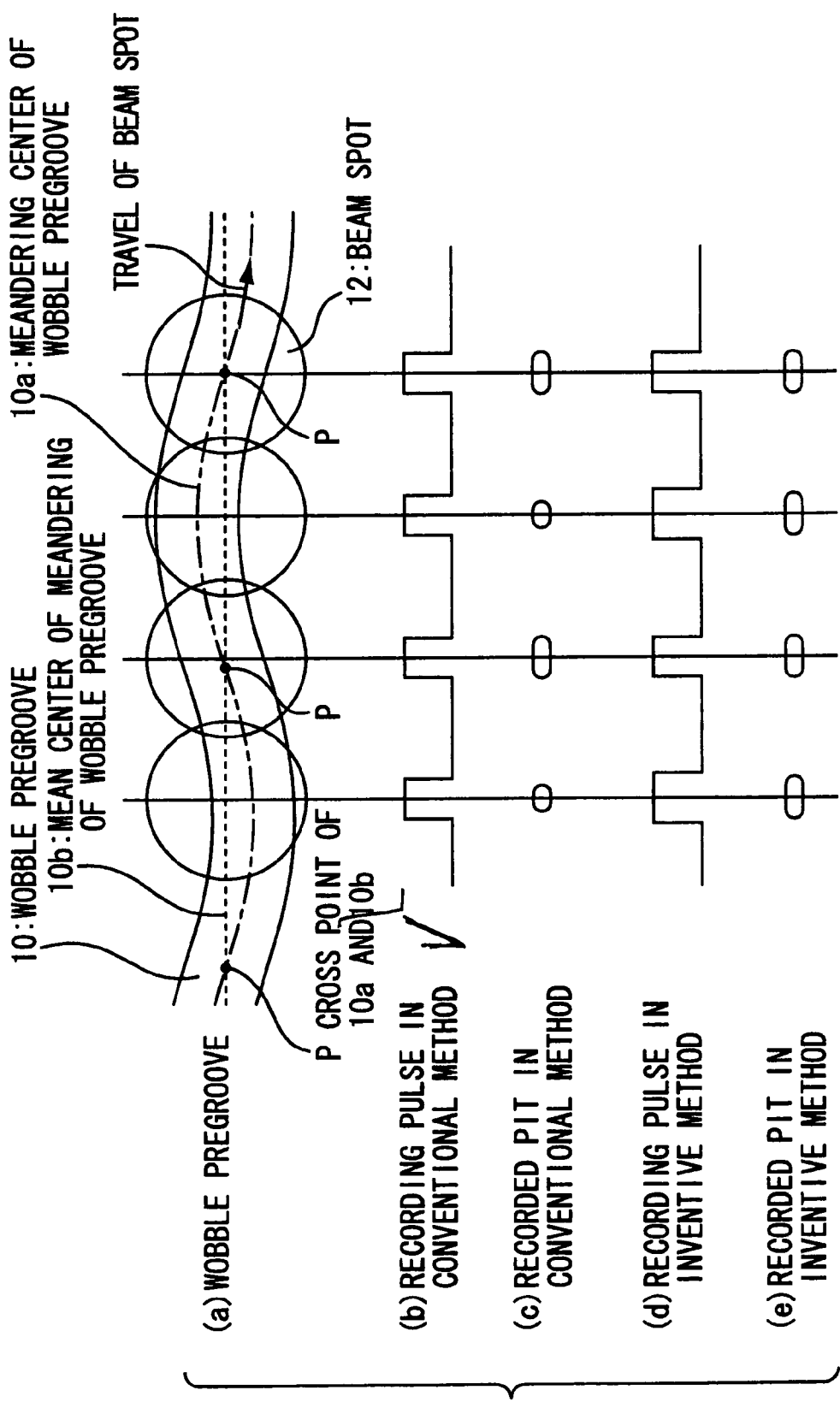

OPTICAL DISC RECORDING AND REPRODUCING METHOD ADAPTIVE TO WOBBLE PREGROOVE

BACKGROUND OF THE INVENTION

1. Technical Field of the Invention

This invention relates to a recording and reproducing method and a recording and reproducing apparatus for an optical disc having a wobble pregroove such as a CD-R, a CD-RW, a DVD+R, a DVD-R, a DVD+RW, and a DVD-RW. Particularly, the recording and reproducing method and apparatus is designed for improving a recording and reproducing quality.

2. Prior Art

In carrying out the recording of information on a CD-R or a CD-RW, a wobble signal is detected from a photo-receiving signal of a return light of a recording laser beam reflected from the optical disc, and a spindle motor control of the optical disc is performed so that that the detected wobble signal has a predetermined wobble frequency. Time information (positional information) is extracted by demodulating an ATIP signal recorded by frequency modulation in the detected wobble signal. Conventionally, to detect a wobble signal (practically, wobble error signal) from a photo-receiving signal of a return light of a recording laser beam, a tracking control is effected by a servo loop having such a low frequency band as to follow an eccentricity of the optical disc while preventing a beam spot of the recording optical beam from tracing the wobbling or meandering of the wobble pregroove. Further, a tracking actuator has a resonance frequency of second order due to its mechanical structure in the order of 8 through 9 kHz, which is lower than a wobbling frequency of 22.05 kHz in case of 1× velocity recording. It is necessary to set the servo band of the tracking control to a relatively low frequency in order to remove the resonance frequency of the second order. Thus, in the conventional recording method, the servo band of the tracking control is set to a relatively low frequency range. Consequently as shown in FIG. 2, a beam spot 12 of the recording optical beam travels along a mean center 10b of meandering of a wobble pregroove 10 on an optical disc recording surface. Thereby, pits 14 are recorded along the mean center 10b of meandering of the wobble pregroove 10.

For an example of the conventional art literature disclosing that pits are recorded along a mean center of meandering of a wobble pregroove by controlling a recording beam spot to follow the mean center of the meandering of the wobble pregroove, there is known the following Patent literature 1.

Patent literature 1 is Japanese Unexamined Patent Publication (Kokai) No. 5-101397

In the conventional recording and reproducing method, the pits 14 are formed significantly off the meandering center 10a of the wobble pregroove 10 and thereby overlapping with a side wall face 10c of the wobble pregroove 10 in places where the meandering center 10a of the wobble pregroove 10 is deviated apart from the mean center 10b of the meandering, thereby causing a problem of deteriorating a recording quality and consequently deteriorating a reproduction quality of the recorded information such as jitter and C1 error.

SUMMARY OF THE INVENTION

The present invention has been provided in view of the above problem. Therefore, it is an object of the present invention to provide an optical disc recording and reproducing method and an optical disc recording and reproducing apparatus for improving the recording and reproducing quality of groove recording.

An inventive optical method is designed for performing information recoding process with respect to an optical disc having a wobble pregroove which continues in a circumferential direction of the optical disc and wobbles in a radial direction of the optical disc such that the wobble pregroove meanders around a mean center line of meandering during the course of continuing in the circumferential direction, wherein the information recording process comprises the steps of irradiating an optical beam along the wobble pregroove to form pits, thereby recording information in the form of the pits, and controlling the recording of the information in accordance with a radial distance of the wobble pregroove relative to the mean center line of meandering.

An inventive optical disc recording method is designed for recording information in the form of pits which are formed by irradiating an optical beam along a wobble pregroove of an optical disc, the wobble pregroove continuing in a circumferential direction of the optical disc and wobbling in a radial direction of the optical disc such that a center line of the wobble pregroove meanders during the course of continuing in the circumferential direction. The inventive method comprises the steps of tracking a spot of the optical beam along the meandering center line of the wobble pregroove, and modulating a power of the optical beam in accordance with the information to be recorded so that the pits are formed along the meandering center line of the wobble pregroove.

According to the inventive method, the pits are formed along the meandering center line of the wobble groove, thereby improving the reproduction quality of the recorded information such as jitter and C1 error.

An inventive optical disc recording method is designed for recording information in the form of pits which are formed by irradiating an optical beam along a wobble pregroove of an optical disc under control of a tracking servo loop, the wobble pregroove continuing in a circumferential direction of the optical disc and wobbling in a radial direction of the optical disc such that the wobble pregroove meanders around a mean center line of meandering during the course of continuing in the circumferential direction. The inventive method comprises a first step of operating the tracking servo loop so as to control a spot of the optical beam for tracking along the mean center line of meandering of the wobble pregroove, a second step of adding a signal corresponding to the wobbling of the wobble pregroove to the tracking servo loop, thereby further controlling the spot of the optical beam to trace the meandering center line of the wobble pregroove, and a third step of modulating a power of the optical beam in accordance with the information to be recorded so that the pits are formed along the meandering center line of the wobble pregroove.

In this case, the first step comprises detecting a tracking error signal representative of an error of the tracking of the spot based on a photo-receiving signal of the optical beam reflected back from the optical disc, and operating the tracking servo loop according to the detected tracking error signal so that the spot of the optical beam follows the mean center line of meandering of the wobble pregroove, and the second step comprises detecting a signal corresponding to the wobbling of the wobble pregroove, and driving a tracking actuator connected to the tracking servo loop so that the spot of the optical beam traces the meandering center line of the wobble pregroove.

An inventive optical disc recording method is designed for recording information in the form of pits which are formed by irradiating an optical beam along a wobble pregroove of an optical disc, the wobble pregroove continuing in a circumferential direction of the optical disc and wobbling in a radial direction of the optical disc such that the wobble pregroove meanders around a mean center line of meandering during the course of continuing in the circumferential direction of the optical disc so that a meandering center line of the wobble pregroove alternately crosses with and deviates from the mean center line of meandering. The inventive optical disc recording method comprises the steps of tracking a spot of the optical beam to the mean center line of meandering of the wobble pregroove such that a radial position of the spot varies in accordance with the wobbling of the wobble pregroove, encoding the information to be recorded into a signal for modulating a power of the optical beam to form the pits along the mean center line of meandering of the wobble pregroove, and generating margin bits during the encoding of the information so as to control a length of the signal such that a short signal is recorded when the spot is positioned where the mean center line of meandering of the wobble pregroove crosses with the meandering center line of the wobble pregroove while a long signal is recorded when the spot is positioned where the mean center line of meandering of the wobble pregroove deviates from the meandering center line of the wobble pregroove.

Accordingly, there are recorded short signals having relatively poor jitter in the vicinity of the center of the meandering amplitude of the wobble groove where relatively high-grade recording is achieved, while there are recorded long signals having relatively good jitter in positions away from the center of the meandering amplitude of the wobble groove where the recording quality deteriorates. Therefore, the jitter is averaged and a recording quality is improved as a whole.

An inventive optical disc recording method is designed for recording information in the form of pits which are formed by irradiating an optical beam along a wobble pregroove of an optical disc, the wobble pregroove continuing in a circumferential direction of the optical disc and wobbling in a radial direction of the optical disc, such that the wobble pregroove meanders around a mean center line of meandering during the course of continuing in the circumferential direction of the optical disc so that a meandering center line of the wobble pregroove alternately crosses with and deviates from the mean center line of meandering. The inventive optical disc recording method comprises the steps of tracking a spot of the optical beam to the mean center line of meandering of the wobble pregroove such that a radial position of the spot varies in accordance with the wobbling of the wobble pregroove, and controlling a power of the optical beam such as to increase the power of the optical beam when the spot is positioned where the mean center line of meandering of the wobble pregroove deviates from the meandering center line of the wobble pregroove as compared to the power of the optical beam when the spot is positioned where the mean center line of meandering of the wobble pregroove crosses with the meandering center line of the wobble pregroove. In this case, the step of controlling alternately increases and decreases the power of the optical beam at a frequency twice as high as a frequency of the wobbling of the wobble pregroove.

Therefore, by increasing the recording power as the center of the beam spot is deviated away from the meandering center of the wobble groove, it becomes possible to counteract the decrease of the recording sensitivity to thereby prevent deterioration in jitter.

An inventive optical disc recording method is designed for recording information in the form of pits which are formed by irradiating an optical beam along a wobble pregroove of an optical disc, the wobble pregroove continuing in a circumferential direction of the optical disc and wobbling in a radial direction of the optical disc, such that the wobble pregroove meanders around a mean center line of meandering during the course of continuing in the circumferential direction of the optical disc so that a meandering center line of the wobble pregroove alternately crosses with and deviates from the mean center line of meandering. The inventive optical disc recording method comprises the steps of tracking a spot of the optical beam to the mean center line of meandering of the wobble pregroove such that a radial position of the spot varies in accordance with the wobbling of the wobble pregroove, encoding the information to be recorded into a signal for modulating a power of the optical beam to form the pits along the mean center line of meandering of the wobble pregroove, determining a pulse width of the signal according to a given strategy, and adjusting the pulse width such as to increase the pulse width when the spot is positioned where the mean center line of meandering of the wobble pregroove deviates from the meandering center line of the wobble pregroove as compared to the pulse width when the spot is positioned where the mean center line of meandering of the wobble pregroove crosses with the meandering center line of the wobble pregroove.

Therefore, by increasing the pulse width of the recording signal as the center of the beam spot is deviated away from the meandering center of the wobble groove, it becomes possible to counteract the decrease of the recording sensitivity to thereby prevent deterioration in jitter.

An inventive optical disc recording apparatus is constructed for recording information in the form of pits which are formed by irradiating an optical beam from an optical pickup along a wobble pregroove of an optical disc, the wobble pregroove continuing in a circumferential direction of the optical disc and wobbling in a radial direction of the optical disc such that the wobble pregroove meanders around a mean center line of meandering during the course of continuing in the circumferential direction. The inventive apparatus comprises a tracking actuator that actuates the optical pickup for tracking a spot of the optical beam relative to the wobble pregroove, a tracking servo loop circuit operative in response to an tracking error signal for controlling the tracking actuator to allow the spot of the optical beam to generally follow the wobble pregroove, the tracking error signal representing an error of the tracking of the spot relative to the wobble pregroove and which is detected from a photo-receiving signal of the optical beam reflected back from the optical disc, a driver for driving the tracking actuator to control the spot of the optical beam to trace a meandering center line of the wobble pregroove based on a signal which corresponds to the wobbling of the wobble signal and which is detected from the photo-receiving signal of the optical beam reflected back from the optical disc, and a modulator that modulates a power of the optical beam in accordance with the information to be recorded so that the pits are formed along the meandering center line of the wobble pregroove.

An inventive optical disc recording apparatus having an optical pickup is constructed for irradiating an optical beam modulated by a recording signal onto a wobble pregroove so as to form pits, the wobble pregroove continuing in a circumferential direction of the optical disc and wobbling in a radial direction of the optical disc, such that the wobble pregroove meanders around a mean center line of meandering during the course of continuing in the circumferential direction of the optical disc so that a meandering center line of the wobble pregroove alternately crosses with and deviates from the mean center line of meandering. The inventive optical disc recording apparatus comprises a tracking actuator for actuating the optical pickup in the radial direction of the optical disc so as to track a spot of the optical beam relative to the wobble pregroove, a tracking control circuit having a detector for receiving the optical beam reflected from the optical disc and generating a tracking error signal from the received optical beam, and a servo controller for controlling the tracking actuator according to the tracking error signal so as to align the spot of the optical beam to the mean center line of meandering of the wobble pregroove such that a radial position of the spot varies in accordance with the wobbling of the wobble pregroove, and a recording signal generating circuit that encodes information to be recorded into the recording signal for modulating the optical beam, and that adds margin bits into the recording signal such that a short pit is recorded when the spot is positioned where the mean center line of meandering of the wobble pregroove crosses with the meandering center line of the wobble pregroove while a long pit is recorded when the spot is positioned where the mean center line of meandering of the wobble pregroove deviates from the meandering center line of the wobble pregroove.

An inventive optical disc recording apparatus is designed for recording information in the form of pits which are formed by irradiating an optical beam from an optical pickup along a wobble pregroove of an optical disc, the wobble pregroove continuing in a circumferential direction of the optical disc and wobbling in a radial direction of the optical disc, such that the wobble pregroove meanders around a mean center line of meandering during the course of continuing in the circumferential direction of the optical disc so that a meandering center line of the wobble pregroove alternately crosses with and deviates from the mean center line of meandering. The inventive optical disc recording apparatus comprises a tracking actuator for actuating the optical pickup in the radial direction of the optical disc so as to track a spot of the optical beam relative to the wobble pregroove, a tracking control circuit having a detector for receiving the optical beam reflected from the optical disc and generating a tracking error signal from the received optical beam, and a servo controller for controlling the tracking actuator according to the tracking error signal so as to align the spot of the optical beam to the mean center line of meandering of the wobble pregroove such that a radial position of the spot varies in accordance with the wobbling of the wobble pregroove, and a power control circuit that controls a power of the optical beam such as to increase the power of the optical beam when the spot is positioned where the mean center line of meandering of the wobble pregroove deviates from the meandering center line of the wobble pregroove as compared to the power of the optical beam when the spot is positioned where the mean center line of meandering of the wobble pregroove crosses with the meandering center line of the wobble pregroove. In this case, the power control circuit alternately increases and decreases the power of the optical beam at a frequency twice as high as a frequency of the wobbling of the wobble pregroove.

An inventive optical disc recording apparatus having an optical pickup is designed for irradiating an optical beam modulated by a recording signal onto a wobble pregroove so as to form pits, the wobble pregroove continuing in a circumferential-direction of the optical disc and wobbling in a radial direction of the optical disc, such that the wobble pregroove meanders around a mean center line of meandering during the course of continuing in the circumferential direction of the optical disc so that a meandering center line of the wobble pregroove alternately crosses with and deviates from the mean center line of meandering. The inventive optical disc recording apparatus comprises a tracking actuator for actuating the optical pickup in the radial direction of the optical disc so as to track a spot of the optical beam relative to the wobble pregroove, a tracking control circuit having a detector for receiving the optical beam reflected from the optical disc and generating a tracking error signal from the received optical beam, and a servo controller for controlling the tracking actuator according to the tracking error signal so as to align the spot of the optical beam to the mean center line of meandering of the wobble pregroove such that a radial position of the spot varies in accordance with the wobbling of the wobble pregroove, and a strategy circuit that determines a pulse width of the recording signal according to a given strategy, and adjusts the pulse width such as to increase the pulse width when the spot is positioned where the mean center line of meandering of the wobble pregroove deviates from the meandering center line of the wobble pregroove as compared to the pulse width when the spot is positioned where the mean center line of meandering of the wobble pregroove crosses with the meandering center line of the wobble pregroove.

An inventive optical method is designed for performing information reproducing process with respect to an optical disc having a wobble pregroove which continues in a circumferential direction of the optical disc and wobbles in a radial direction of the optical disc such that the wobble pregroove meanders around a mean center line of meandering during the course of continuing in the circumferential direction, wherein the information reproducing process comprises the steps of irradiating an optical beam along the wobble pregroove to optically detect pits which are formed along the wobble pregroove, thereby reproducing information in the form of the detected pits, and controlling the reproducing of the information in accordance with a radial distance of the wobble pregroove relative to the mean center line of meandering.

An inventive optical disc reproducing method is designed for reproducing information by irradiating an optical beam to pits formed along a wobble pregroove of an optical disc, the wobble pregroove continuing in a circumferential direction of the optical disc and wobbling in a radial direction of the optical disc such that a center line of the wobble pregroove meanders during the course of continuing in the circumferential direction. The inventive method comprises the steps of tracking a spot of the optical beam along the meandering center line of the wobble pregroove, and reproducing the information based on a photo-receiving signal of the optical beam reflected back from the wobble pregroove formed with the pits. In this case, the step of tracking comprises first detecting a tracking error signal representative of an error of the tracking of the spot based on the photo-receiving signal of the optical beam reflected back from the optical disc, then controlling a tracking servo loop according to the detected tracking error signal so that the spot of the optical beam follows the mean center line of meandering of the wobble pregroove, second detecting a signal corresponding to the wobbling of the wobble pregroove based on the photo-receiving signal of the optical beam reflected back from the optical disc, and driving a tracking actuator connected to the tracking servo loop so that the spot of the optical beam traces the meandering center line of the wobble pregroove.

An inventive optical disc reproducing apparatus is designed for reproducing information from pits formed in a wobble pregroove of an optical disc by irradiating an optical beam from an optical pickup to the wobble pregroove, the wobble pregroove continuing in a circumferential direction of the optical disc and wobbling in a radial direction of the optical disc such that the wobble pregroove meanders around a mean center line of meandering during the course of continuing in the circumferential direction. The inventive apparatus comprises a tracking actuator that actuates the optical pickup for tracking a spot of the optical beam relative to the wobble pregroove, a tracking servo loop circuit operative in response to an tracking error signal for controlling the tracking actuator to allow the spot of the optical beam to generally follow the wobble pregroove, the tracking error signal representing an error of the tracking of the spot relative to the wobble pregroove and which is detected form a photo-receiving signal of the optical beam reflected back from the optical disc, a driver for driving the tracking actuator to control the spot of the optical beam to trace the meandering of the wobble pregroove based on a signal which corresponds to the wobbling of the wobble signal and which is detected from the photo-receiving signal of the optical beam reflected back from the optical disc, and an encoder that reproduces the information based on the photo-receiving signal of the optical beam reflected back from the wobble pregroove formed with the pits.

BRIEF DESCRIPTION OF THE DRAWINGS

FIG. 5 is a graph showing loop gain characteristics of a tracking servo loop of the optical disc recording and reproducing apparatus shown in FIG. 1.

FIG. 18 is an operation waveform diagram of the optical disc recording and reproducing apparatus shown in FIG. 17.

DETAILED DESCRIPTION OF THE INVENTION

The preferred embodiments of the present invention will now be described hereinafter. The description here is made by giving an example of recording information on a CD-R disc or a CD-RW disc and reproducing information from a CD-R disc or a CD-RW disc.

First Embodiment 1

Figure 1:
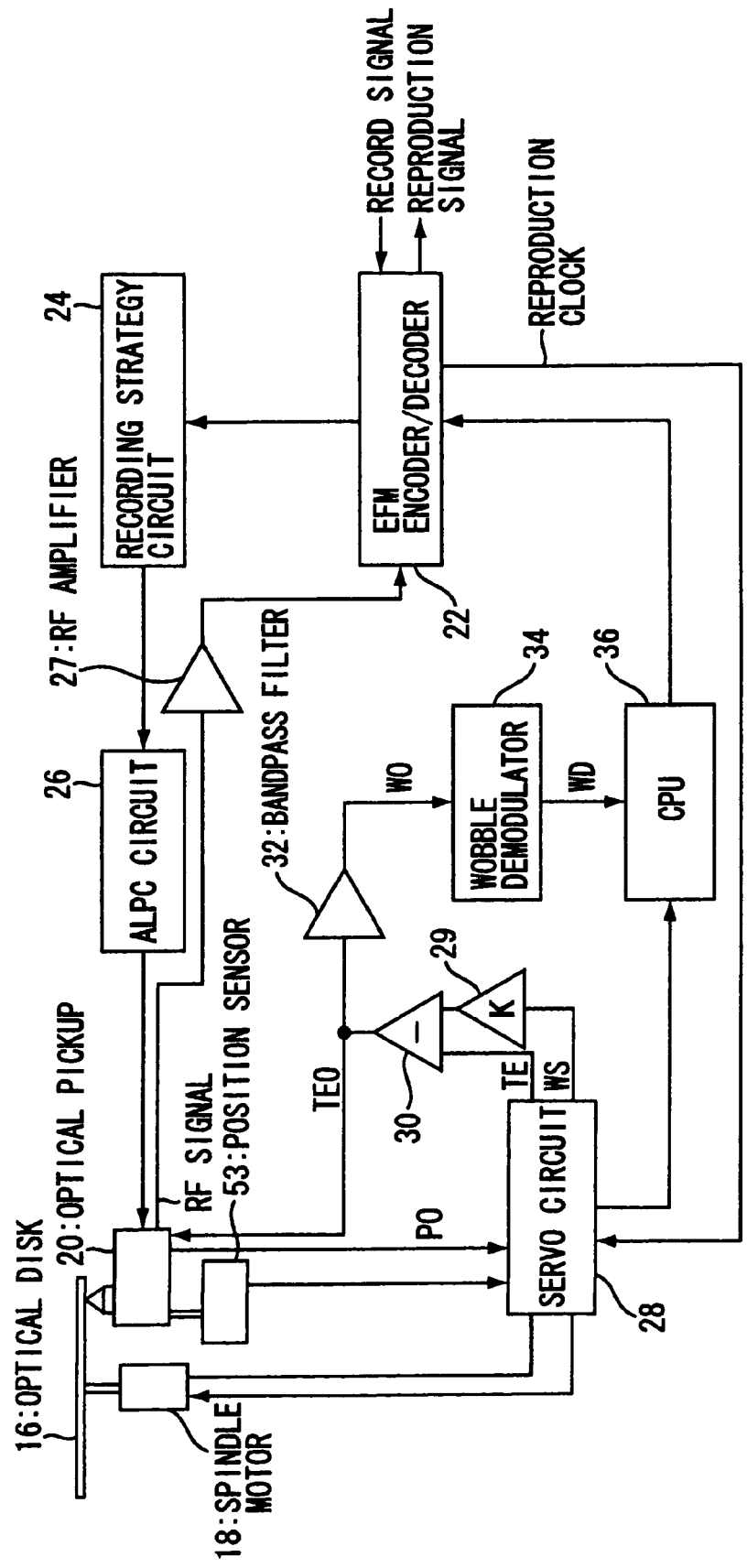
FIG. 1 is a control block diagram showing an optical disc recording and reproducing apparatus according to a first embodiment of the present invention.
Figure 2:
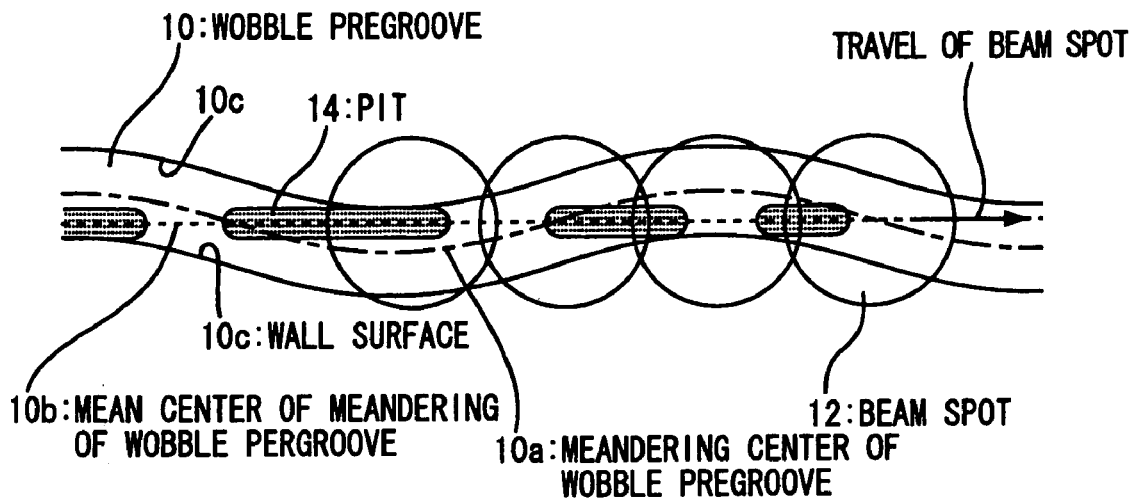
FIG. 2 is a diagram showing a conventional recording and reproducing method.

A first embodiment 1 of the present invention is described below. In this embodiment, pits are recorded along a center of meandering of a wobble pregroove by causing a beam spot of a recording optical beam to follow the center of the meandering of the wobble pregroove. Further, the pit recording can be reproduced by irradiating a reproducing optical beam to the wobble pregroove. Referring to FIG. 1, there is shown a control block of an optical disc recording and reproducing apparatus. An optical disc (a CD-R disc or a CD-RW disc) 16 is driven by a spindle motor 18 and information is recorded and reproduced by an optical pickup 20. In recording operation, a record signal is EMF-modulated by an EFM encoder/decoder 22 and is corrected in a time axis (irradiation start or end timing, irradiation time) by a recording strategy circuit 24. An automatic laser power control (ALPC) circuit 26 drives a laser source contained in the optical pickup 20 according to the corrected record signal to record the information on the disc 16. The recording laser power in this process is controlled to a command value by means of the ALPC control. In reproducing operation, an RF signal outputted from the optical pickup 20 is amplified by an RF amplifier 27 and EFM-decoded by an EFM encoder/decoder 22, thereby obtaining a reproduction signal.

In either of the recording and reproducing operations, a servo circuit 28 performs a focus control, a tracking control, a feed control, a spindle control, and the like on the basis of a photo-receiving signal PO output from the optical pickup 20. The servo circuit 28 outputs a tracking error signal TE and a wobble error signal WS. The wobble error signal WS is amplified by an amplifier 29 with gain K. An amplifier 30 (subtractor) generates a tracking drive signal TEO by synthesizing the tracking error signal TE and the wobble error signal WS, using the following equation:

$$TEO = TE - K \times WS \qquad \text{(Eq. 1)}$$

(K is a constant which represents the gain of the amplifier 29 and which is determined according to a sensitivity of a tracking actuator so as to enable the optical spot to trace the meandering center of the wobble pregroove.)

The tracking drive signal TEO is applied to a tracking actuator contained in the optical pickup 20 to perform the tracking control. The tracking drive signal TEO includes tracking error components and wobble error components. The signal TEO is filtered with a bandpass filter 32 whose center frequency is set to a wobble frequency (22.05 kHz for recording at 1× speed, 44.1 kHz for recording at 2× speed, - - - , and n×22.05 kHz for recording at n× speed) so as to extract a wobble signal WO. A wobble demodulator 34 demodulates the extracted wobble signals WO and outputs wobble data (ATIP information) WD. A CPU 36 reproduces time information (positional information) or the like of a recording position from the wobble data WD.

Figure 3:
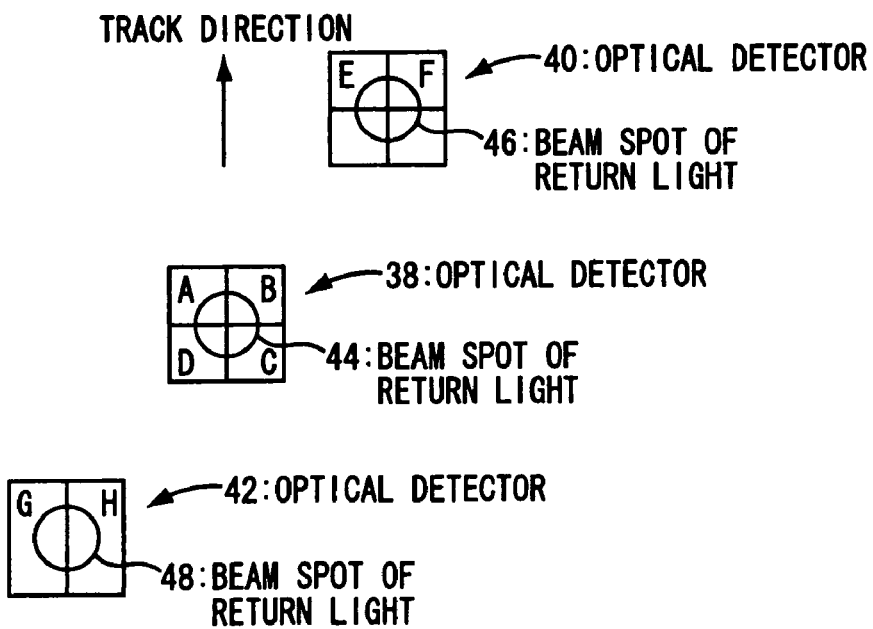
FIG. 3 is a plan view showing an illustrative arrangement of an optical detector equipped in an optical pickup.

The optical pickup 20 performs a tracking control in a three-beam differential push-pull method. An illustrative arrangement of optical detectors in the optical pickup 20 is shown in FIG. 3. Each of the optical detectors 38, 40, and 42 comprises a PIN photo diode. The optical detector 38 comprises a four-part divided photo-receiving device and forms a beam spot 44 with an irradiation of a return light of a main beam. The optical detector 40 comprises a two-part laterally divided photo-receiving device and forms a beam spot 46 with an irradiation of a return light of a preceding sub-beam. The optical detector 42 comprises a two-part laterally divided photo-receiving device and forms a beam spot 48 with an irradiation of a return light of a following sub-beam. Assuming that the divided areas A, B, C, and D of the optical detector 38, the divided areas E and F of the optical detector 40, and the divided areas G and H of the optical detector 42 are arranged in a track direction as shown in FIG. 3, a reproduced RF signal and a servo signal are found by the following calculation on the basis of the photo-receiving signals A to H of the divided areas A to H.

Reproduced $RF$ signal$=A+B+C+D$

Focus error signal$=(A+C)-(B+D)$

Three-beam differential push-pull tracking error signal$=\{(A+D)-(B+C)\}-k\{(E-F)+(G-H)\}$ (Eq. 2)

(k is a constant for interfacing with the photo-receiving signals of the main beam)

Figure 4:
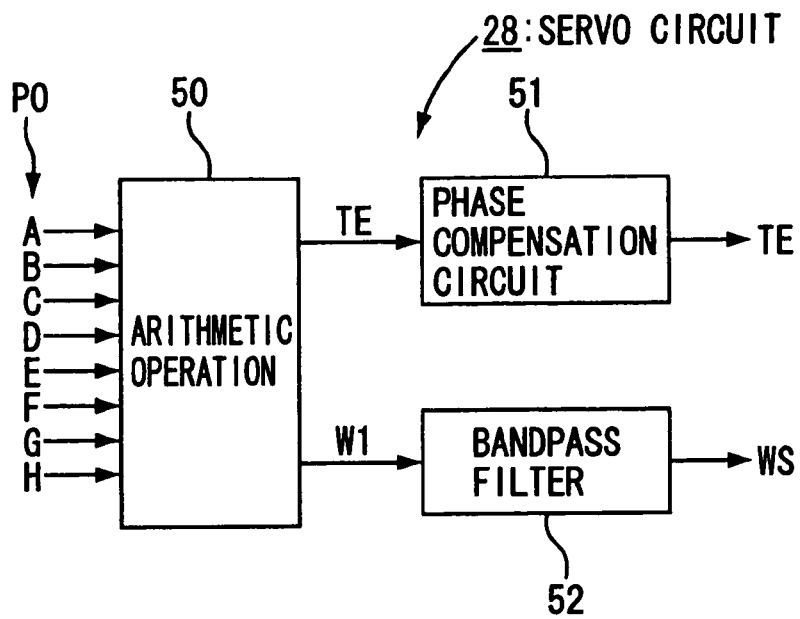
FIG. 4 is a block diagram showing a circuitry for generating a tracking error signal TE and a wobble error signal WS in a servo circuit in FIG. 1.

Referring to FIG. 4, there is shown a circuitry for generating the tracking error signal TE' and the wobble error signal WS in the servo circuit 28 shown in FIG. 1. A phase of the tracking error signal TE' is compensated by a phase compensation circuit 51 to create a phase-compensated tracking error signal TE. An arithmetic circuit 50 generates the tracking error signal TE by using the above equation (Eq. 2). In addition, the arithmetic circuit 50 generates a signal W1 by using the following equation:

$W1=(A+B)-(C+D)$ (Eq. 3)

A bandpass filter 52 filters the signal W1 to generate the wobble error signal WS with a wobble frequency (22.05 kHz for recording/reproducing at 1× speed, 44.1 kHz for recording/reproducing at 2× speed, - - - , and n×22.05 kHz for recording/reproducing at n× speed) set as a center frequency. A pass band of the bandpass filter 52 is switched according to the recording speed rate to be used for extracting only the wobble frequency component. For example, a plurality of band pass filters are prepared in correspondence to different recording speed rates, and one of the bandpass filters is selected corresponding to the recording speed rate to be used. Otherwise, a circuitry constant of a digital bandpass filter is changed in accordance with the recording speed rate to be used.

FIG. 5 shows a loop gain characteristic of the tracking servo loop. The tracking actuator and associated lens are supported by a spring, hence the loop gain characteristic of the tracking servo loop has a resonance frequency of first order at frequency f0. The loop gain reaches to 1 (0 dB) around frequency f1 ranging 1 through 5 kHz. The phase compensation circuit 52 operates to reduce a slope of the gain characteristic in the particular frequency range around the frequency f1, thereby creating a sufficient phase margin. The resonance frequency f2 of second order falls within the range of 8 through 10 kHz, and the loop gain at f2 is set below 0 dB. As mentioned before, the wobble frequency f3 is 22.05 kHz for recording/reproducing at 1× speed, 44.1 kHz for recording/reproducing at 2× speed, - - - , and n×22.05 kHz for recording/reproducing at n× speed. The loop gain of the tracking servo is set higher than 0 dB in the frequency range around the wobble frequency f3 by means of the bandpass filter 52 and the amplifier 29.

Figure 6:
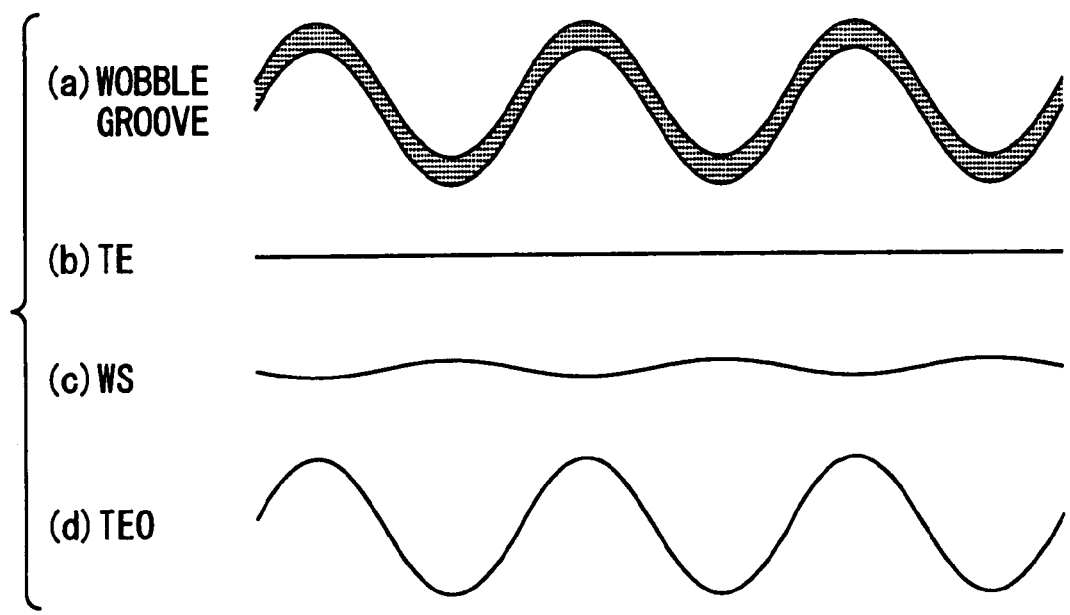
FIG. 6 is an operation waveform diagram of the optical disc recording and reproducing apparatus shown in FIG. 1.
Figure 7:
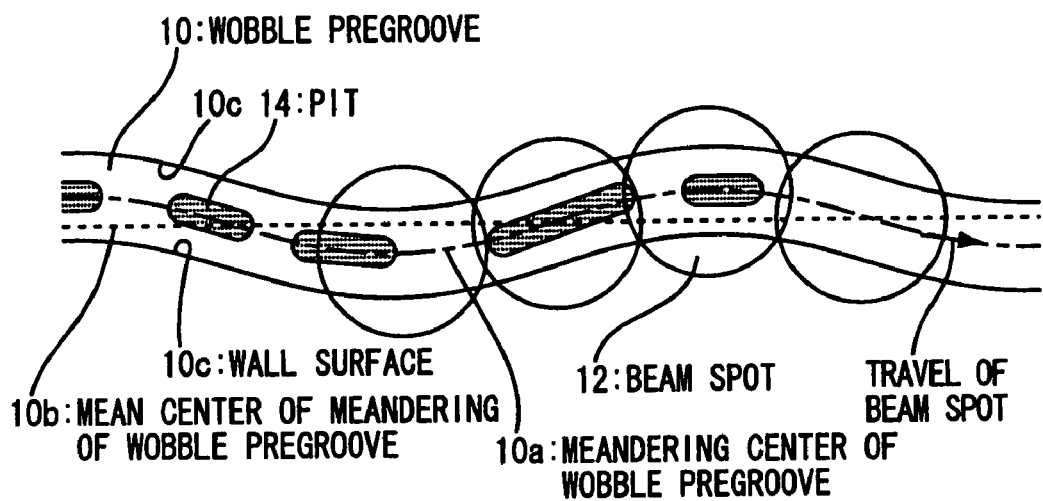
FIG. 7 is a diagram showing tracks of a recording beam spot and pits formed on an optical disc recording surface when using the optical disc recording and reproducing apparatus shown in FIG. 1.

Referring to FIG. 6, there are shown operation waveforms during recording and reproducing operation with the optical disc recording and reproducing apparatus shown in FIG. 1. In FIG. 6, there are shown waveforms (a), (b), (c), and (d) for the wobble pregroove, the tracking error signal TE, the wobble error signal WS, and the tracking drive signal TEO, respectively. The tracking error signal TE has a substantially fixed value (only residual deviation) when the tracking servo is applied. The wobble error signal WS has also a substantially fixed value (only residual deviation) when the tracking servo is applied. The wobble error signal WS is amplified by the amplifier 29. The amplified wobble error signal WS is mixed to the tracking error signal TE by the amplifier 30 (subtractor) according to the above-mentioned Equation 1, thereby creating the tracking drive signal TEO. The tracking actuator of the optical pickup 20 is driven by the tracking drive signal TEO, so that the optical spot of the recording and reproducing laser beam can trace the meandering center of the wobble pregroove while following fluctuation of the track due to eccentricity of the optical disc. In the recording operation, as shown in FIG. 7, this causes the beam spot 12 of the recording beam (the main beam) to travel along the meandering center 10a of the wobble pregroove 10. Thereby, the pits 14 are recorded within the width of the wobble pregroove 10 (without overlapping with the wall face 10c of the wobble pregroove) along the meandering center 10a of the wobble pregroove. Further in the reproducing operation of the optical disc where the pits 14 are formed along the meandering center line 10a of the wobble pregroove 10, an optical spot 12 of reproducing laser beam is controlled to travel along the meandering center 10a of the wobble pregroove 10 to exactly hit the center of each pit 14.

Figure 8:
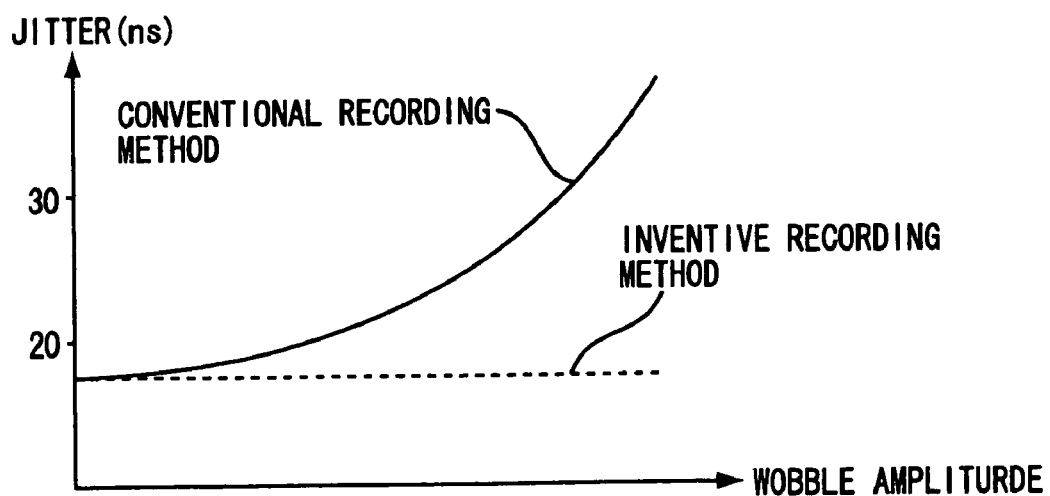
FIG. 8 is a diagram showing changes in jitter of a reproduced signal caused by a wobble amplitude regarding the conventional recording and reproducing method and a recording and reproducing method for use in the optical disc recording and reproducing apparatus of FIG. 1.

Referring to FIG. 8, there are shown changes in jitter of reproduced signals depending on a wobble amplitude regarding the conventional recording and reproducing method and the recording and reproducing method for use in the optical disc recording and reproducing apparatus shown in FIG. 1. According to FIG. 8, an area where a pit overlaps with a wall face gets larger and thus the jitter increases as the wobble amplitude increases in the conventional recording and reproducing method. In contrast, in the recording and reproducing method for use in the recording and reproducing apparatus shown in FIG. 1, pits are recorded within the width of the wobble pregroove 10 along the meandering center 10a of the meandering of the wobble pregroove 10 independently of the wobble amplitude, thus enabling a limitation of the jitter to low value.

The spindle control (constant linear velocity control) in recording can be performed with wobble components since the wobble components are obtained from, for example, the wobble signal WO. Otherwise, it is also possible to perform a spindle control by providing a position sensor 53 for detecting a disc radial position of the optical pickup 20, calculating a target value of a revolution speed of the spindle motor 18 at each point in time of recording from a position detected by the position sensor 53 and linear velocity information of the optical disc 16, and controlling the revolution speed of the spindle motor 18 to the target value.

Figure 9:
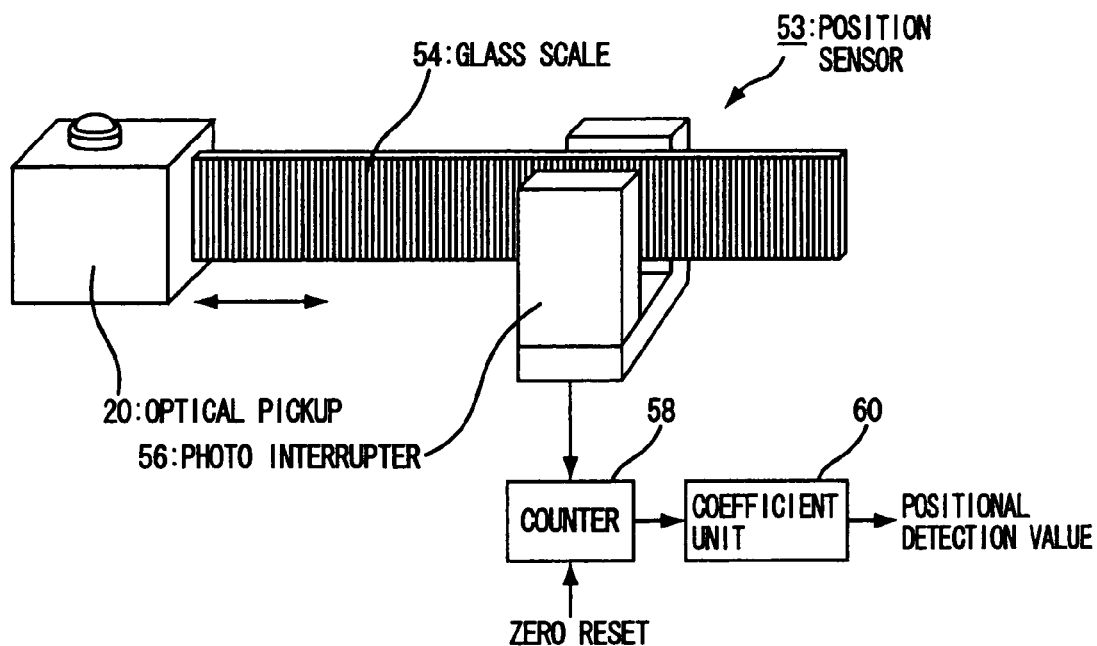
FIG. 9 is a perspective view typically showing a concrete example of a position sensor for detecting a radial position of the optical pickup.
Figure 10:
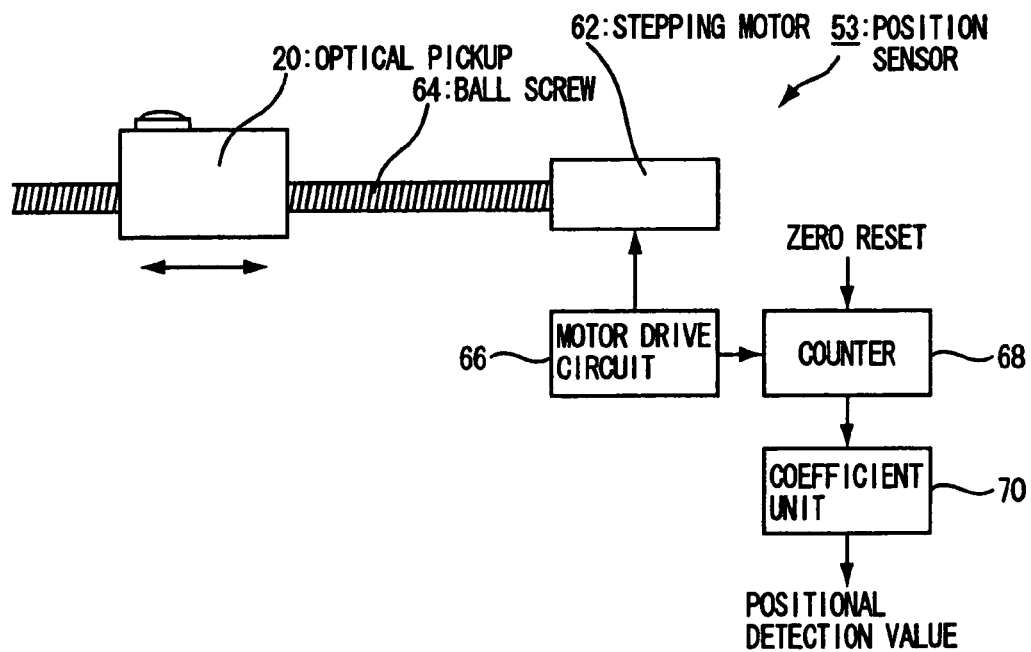
FIG. 10 is a perspective view typically showing another concrete example of a position sensor for detecting a radial position of the optical pickup.

A concrete example of the position sensor for detecting the disc radial position of the optical pickup is shown in FIG. 9 and FIG. 10. The position sensor shown in FIG. 9 has such an arrangement that the optical pickup 20 is fit with a glass scale 54 along its feed direction, a photo interrupter 56 is arranged on a base supporting the optical pickup 20, and the glass scale 54 moves inside the photo interrupter 56 with a move of the optical pickup 20. The glass scale 54 has slits formed at intervals of a given pitch (for example, 50 μm). A counter 58 counts the number of slits from a home position in the feed direction and a coefficient unit 60 multiplies the obtained value by a coefficient equivalent to the slit pitch, thereby enabling a detection of a disc radial position of the optical pickup 20.

Referring to FIG. 10, there is shown an illustrative configuration of the position sensor using a mechanism as a feed mechanism of the optical pickup 20 that uses a stepping motor 62 as a source of drive to feed the optical pickup 20 in the disc radial direction by means of a ball screw 64, which is directly connected to the stepping motor 62. A counter 68 counts the number of step pulses from the home position in a direction of a feed with a motor drive circuit 66. Then, a coefficient unit 70 multiplies the obtained value by a coefficient depending on [a feed pitch of the ball screw 64 divided by the number of step pulses per revolution of the ball screw 64], thereby enabling a detection of the disc radial position of the optical pickup 20.

For example, when the optical disc 16 is put on the optical disc recording and reproducing apparatus, the linear velocity information is obtained, for example, by applying a focus servo, a tracking servo, and a feed servo, for example, at a position 25 mm radially away from the center, applying a spindle servo so as to achieve a frequency of 22.05 kHz of a wobble signal WO detected then, finding the revolution speed of the spindle motor 18 at that time from a frequency generator (FG) signal of the spindle motor, and calculating [2π×25× the number of revolutions per second]. On the other hand, the spindle control in the reproducing operation is carried out to control the rotation number of the spindle motor 18 so that a clock signal reproduced from the RF signal is maintained to a predetermined frequency.

Second Embodiment

Figure 11:
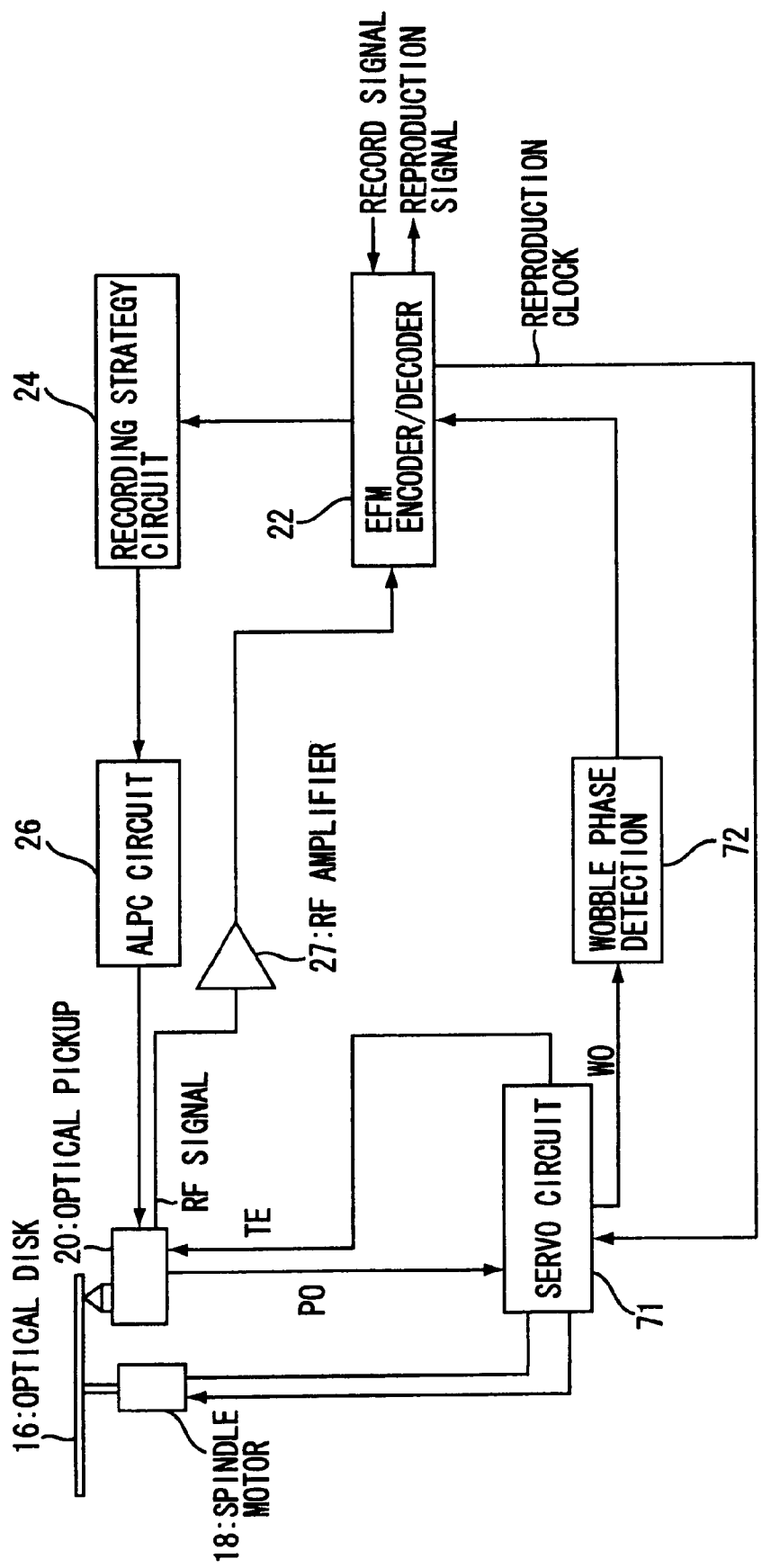
FIG. 11 is a diagram showing a control block diagram of an optical disc recording and reproducing apparatus according to a second embodiment of the present invention.

A second embodiment of the present invention will be described hereinafter. In the recording operation of this embodiment, pits are recorded along a mean center of meandering of a wobble pregroove by causing a recording beam spot to follow the mean center of the meandering of the wobble pregroove, and margin bits are generated in the recording operation so that shorter signals are recorded in the vicinity of the center of the meandering amplitude of the wobble pregroove, namely around a cross point where the mean center of meandering crosses with the meandering center of the wobble pregroove. Further in the reproducing operation, the spot of the reproducing beam is controlled to trace the mean center line of meandering of the wobble pregroove so as to reproduce the recorded information. Referring to FIG. 11, there is shown a control block of the optical disc recording and reproducing apparatus. The same reference numerals have been used as in FIG. 1 for similar parts or signals. An optical disc 16 is driven by a spindle motor 18, thereby causing an optical pickup 20 to record and reproduce information. In the recording operation, a record signal is EFM-modulated by an EFM encoder/decoder 22 and corrected in a time axis by a recording strategy circuit 24. An ALPC circuit 26 drives a laser source in the optical pickup 20 according to the corrected record signal to record the information on the disc 16. The recording laser power in this process is controlled to a command value by means of the ALPC control. On the other hand, in the reproducing operation, the RF signal outputted from the optical pickup 20 is amplified by the RF amplifier 27 and then EFM-decoded by the EFM encoder/decoder 22, thereby obtaining a reproduction signal.

In both of the recording and reproducing operations, a servo circuit 71 performs a focus control, a tracking control, a feed control, a spindle control, and the like on the basis of a photo-receiving signal PO output from the optical pickup 20. The tracking control is performed on the basis of a tracking error signal TE from which wobble components have been removed. As a result, in the recording operation, the recording beam spots follows the mean center of the meandering of the wobble pregroove, thereby causing pits to be recorded along the mean center of the meandering of the wobble pregroove. On the other hand, in the reproducing operation, the reproducing beam spot is controlled to trace the mean center of meandering of the wobble pregroove.

In the recording operation, the servo circuit 71 detects a wobble signal WO on the basis of the photo-receiving signal PO and controls the spindle motor 18 so that the wobble signal WO is detected at a given wobble frequency (22.05 kHz for recording at 1× speed, 44.1 kHz for recording at 2× speed, - - - , and n×22.05 kHz for recording at n× speed) for a constant linear velocity control. On the other hand, in the reproducing operation, the servo circuit 71 controls the rotation number of the spindle motor 18 so as to keep the clock signal derived from the RF signal at a predetermined frequency, thereby performing the constant linear velocity control.

A wobble phase detector 72 detects a phase of the wobble signal WO to detect a timing when the beam spot passes through a cross point where the meandering center of the wobble pregroove crosses the mean center of the meandering of the wobble pregroove. The EFM encoder/decoder 22 carries out the EFM modulation on the basis of the timing detection in such a way as to record a relatively short signal when the spot is positioned where the mean center line of meandering of the wobble pregroove crosses with the meandering center line of the wobble pregroove while a long signal is recorded when the spot is positioned where the mean center line of meandering of the wobble pregroove deviates from the meandering center line of the wobble pregroove. This modulation can be achieved by selecting a margin bit pattern. More specifically, the CD-standard margin bits are three bits and there are defined four types of the patterns, "000," "001," "010," and "100." The EFM encoder/decoder 22 selects and adds a margin bit pattern in such a way as to record a relatively short signal when the spot is positioned where the mean center line of meandering of the wobble pregroove crosses with the meandering center line of the wobble pregroove while a long signal is recorded when the spot is positioned where the mean center line of meandering of the wobble pregroove deviates from the meandering center line of the wobble pregroove, within a range conforming to the run-length limitation (a rule of inserting continuous two to 10 "0s" between "1" and "1"). Accordingly, there are recorded short signals having relatively poor jitter in the vicinity of the cross point between the mean center of meandering and the meandering center of the wobble pregroove where relatively high-grade recording is achieved, while there are recorded long signals having relatively good jitter in positions away from the cross point where the recording quality deteriorates. Therefore, the jitter is averaged and a recording quality is improved as a whole.

Figure 12:
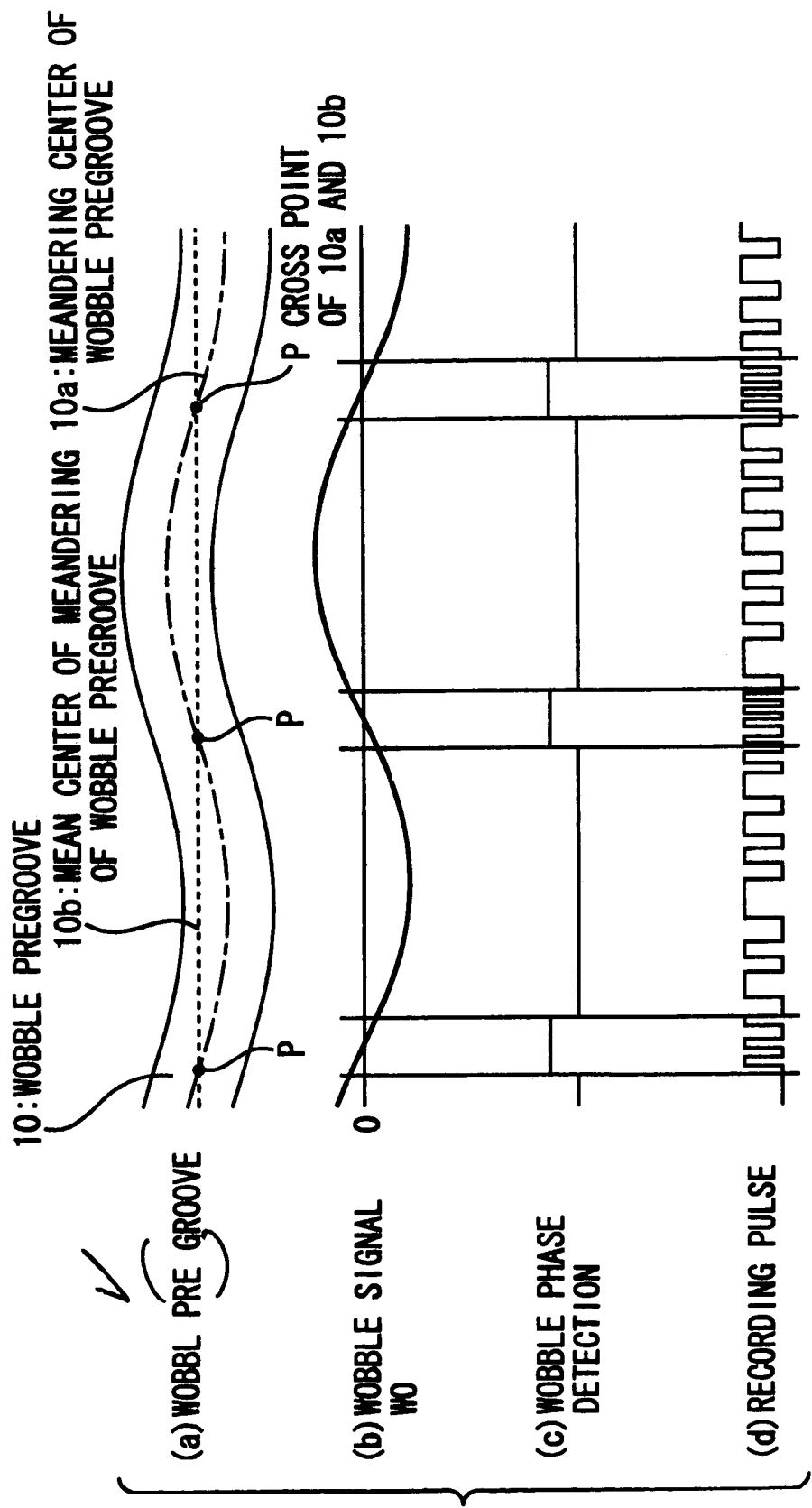
FIG. 12 is an operation waveform diagram of the optical disc recording and reproducing apparatus shown in FIG. 11.

Referring to FIG. 12, there are shown operation waveforms during recording with the optical disc recording and reproducing apparatus shown in FIG. 11. In FIG. 1, there are shown waveforms (a), (b), (c), and (d) for the wobble pregroove, the wobble signal WO, the detection output of the wobble phase detector 72, and the recording pulses, respectively. A pit is recorded during a period of "1" of the recording pulse in (d). Accordingly, short pits are recorded in the vicinity of the cross point P between the mean center of meandering and the meandering center of the wobble pregroove and long pits are recorded in the vicinity of a peak of the meandering amplitude of the wobble pregroove.

Third Embodiment

Figure 13:
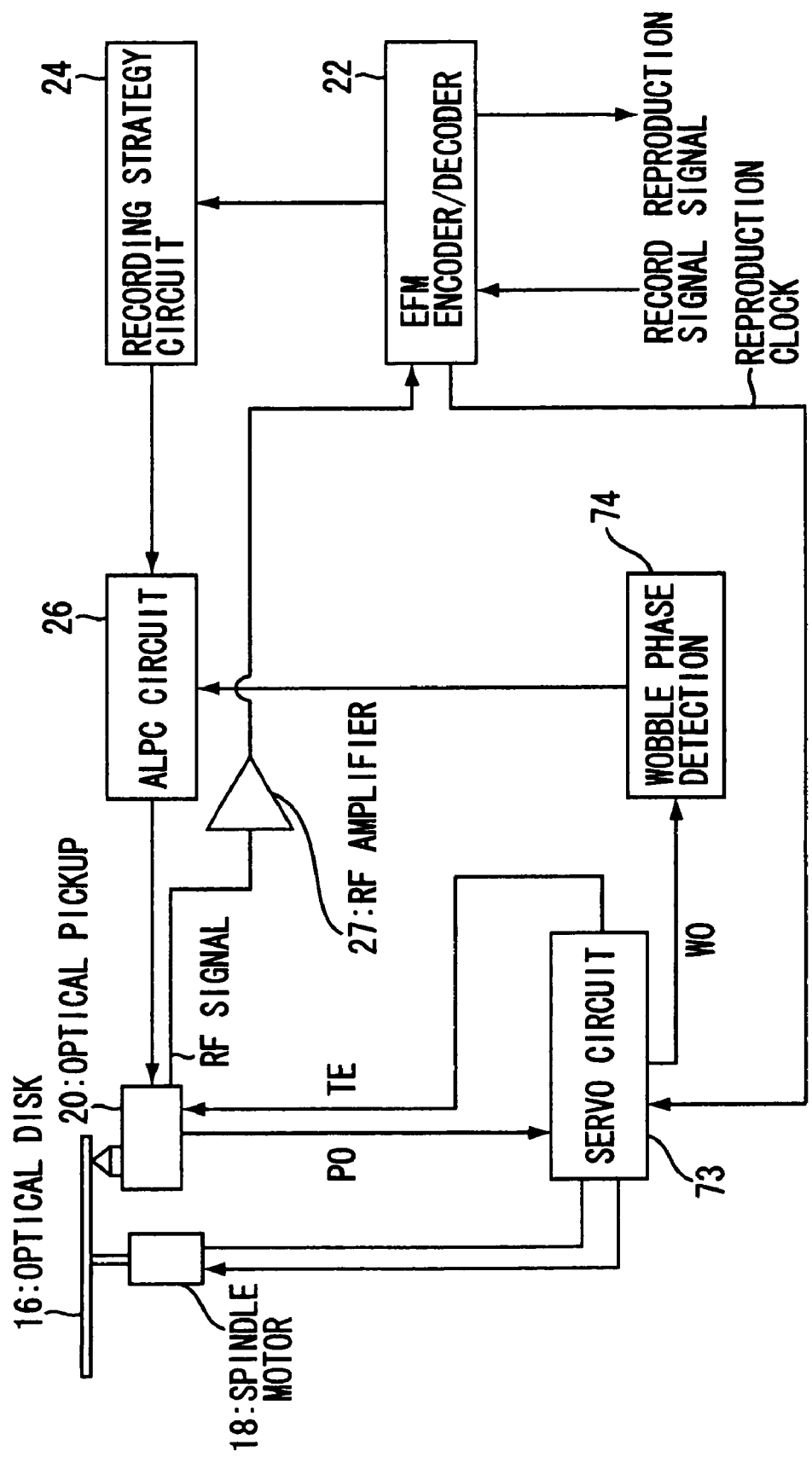
FIG. 13 is a diagram showing a control block diagram of an optical disc recording and reproducing apparatus according to a third embodiment of the present invention.

A third embodiment of the present invention will be described hereinafter. In the recording operation of this embodiment, pits are recorded along a mean center of meandering of a wobble pregroove by causing a recording beam spot to follow the mean center of the meandering of the wobble pregroove, and in recording at positions off the center of the meandering amplitude where the meandering center deviates from the mean center of meandering, higher recording power is applied than in recording at the center of the meandering amplitude where the meandering center crosses with the mean center of meandering of the wobble pregroove. In the reproducing operation, the reproducing beam spot is controlled to trace the mean center of meandering of the wobble pregroove to reproduce the information. Referring to FIG. 13, there is shown a control block of the optical disc recording and reproducing apparatus. The same reference numerals have been used as in FIG. 1 and FIG. 11 for similar parts or signals. In the recording operation, an optical disc 16 is driven by a spindle motor 18, thereby causing an optical pickup 20 to record information. A record signal is EFM-modulated by an EFM encoder/decoder 22 and corrected in a time axis by a recording strategy circuit 24. An ALPC circuit 26 drives a laser source in the optical pickup 20 according to the corrected record signal to record the information on the disc 16. The recording laser power in this process is controlled to a command value by means of the ALPC control. On the other hand, in the reproducing operation, the RF signal outputted from the optical pickup 20 is amplified by the RF amplifier 27 and then EFM-decoded by the EFM encoder/decoder 22, thereby obtaining a reproduction signal.

In both of the recording and reproducing operations, a servo circuit 73 performs a focus control, a tracking control, a feed control, a spindle control, and the like on the basis of a photo-receiving signal PO output from the optical pickup 20. The tracking control is performed on the basis of a tracking error signal TE from which wobble components have been removed. As a result, in the recording operation, the recording beam spot follows the mean center of the meandering of the wobble pregroove, thereby causing pits to be recorded along the mean center of the meandering of the wobble pregroove. On the other hand, in the reproducing operation, the reproducing beam spot is controlled to trace the mean center of meandering of the wobble pregroove.

In the recording operation, the servo circuit 73 detects a wobble signal WO on the basis of the photo-receiving signal PO and controls the spindle motor 18 so that the wobble signal WO is detected at a given wobble frequency (22.05 kHz for recording at 1× speed, 44.1 kHz for recording at 2× speed, - - - , and n×22.05 kHz for recording at n× speed) for a constant linear velocity control. On the other hand, in the reproducing operation, the servo circuit 71 controls the rotation number of the spindle motor 18 so as to keep the clock signal derived from the RF signal at a predetermined frequency, thereby performing the constant linear velocity control.

Figure 14:
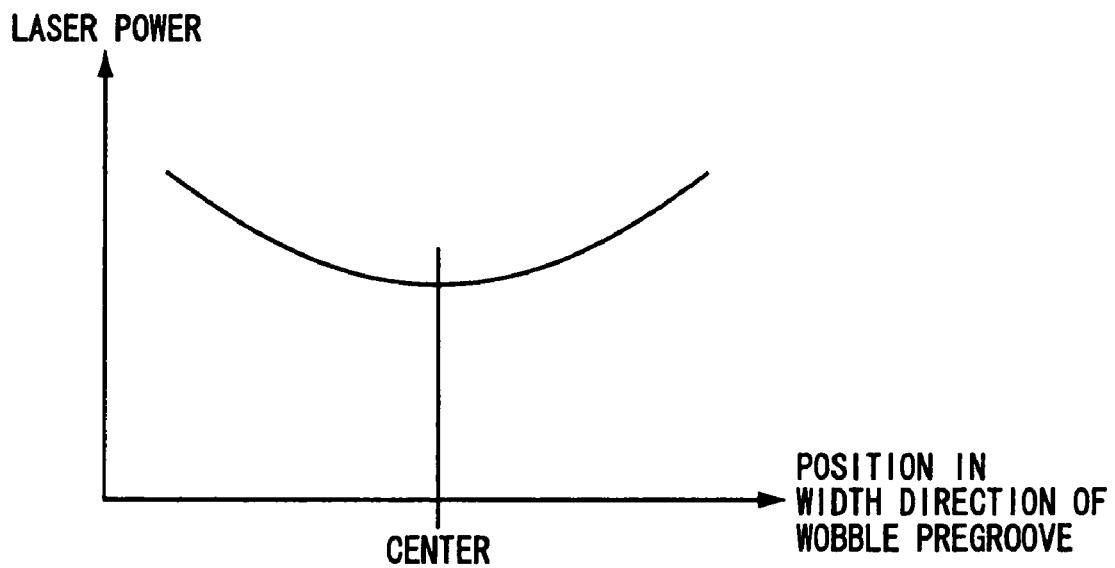
FIG. 14 is a diagram showing a control characteristic of a recording laser power command value of an ALPC circuit controlled by a wobble phase detector in FIG. 13.
Figure 15:
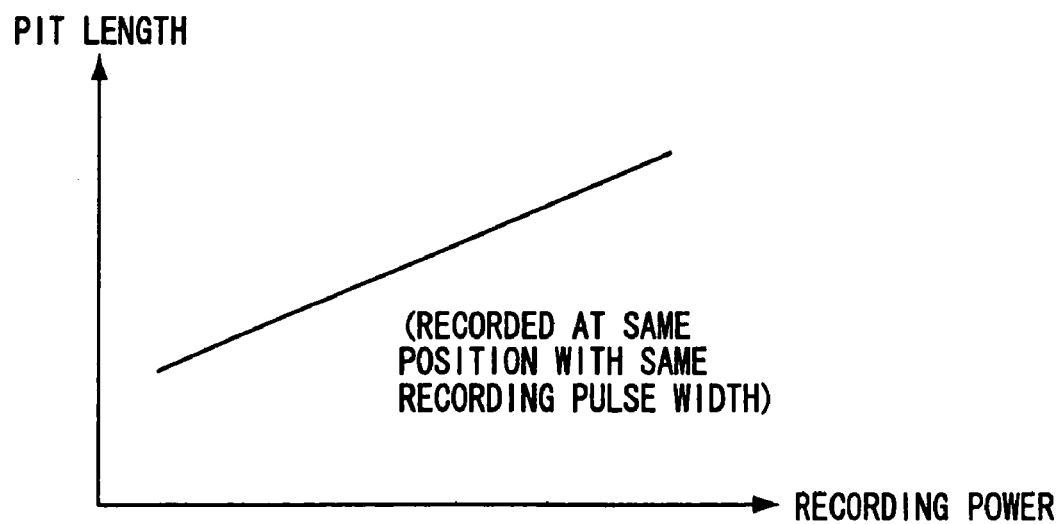
FIG. 15 is a diagram showing a characteristic of a pit length in recording with recording power changed at the same position while keeping the same recording pulse width.

A wobble phase detector 74 detects a phase of the wobble signal WO to control a recording laser power command value of the ALPC circuit 26. More specifically, since the recording sensitivity decreases as the center of the beam spot is further away from the center of the meandering of the wobble pregroove, the recording power is increased as the center of the beam spot is further away from the center of the meandering of the wobble pregroove as shown in FIG. 14. Accordingly, as shown in FIG. 15, a length of a formed pit increases if the recording power is increased when pits are recorded with the same recording pulse width at the same position. Therefore, by increasing the recording power as the center of the beam spot is further away from the center of the meandering of the wobble pregroove, it becomes possible to counteract the decrease the recording sensitivity to prevent a decrease in jitter.

Figure 16:
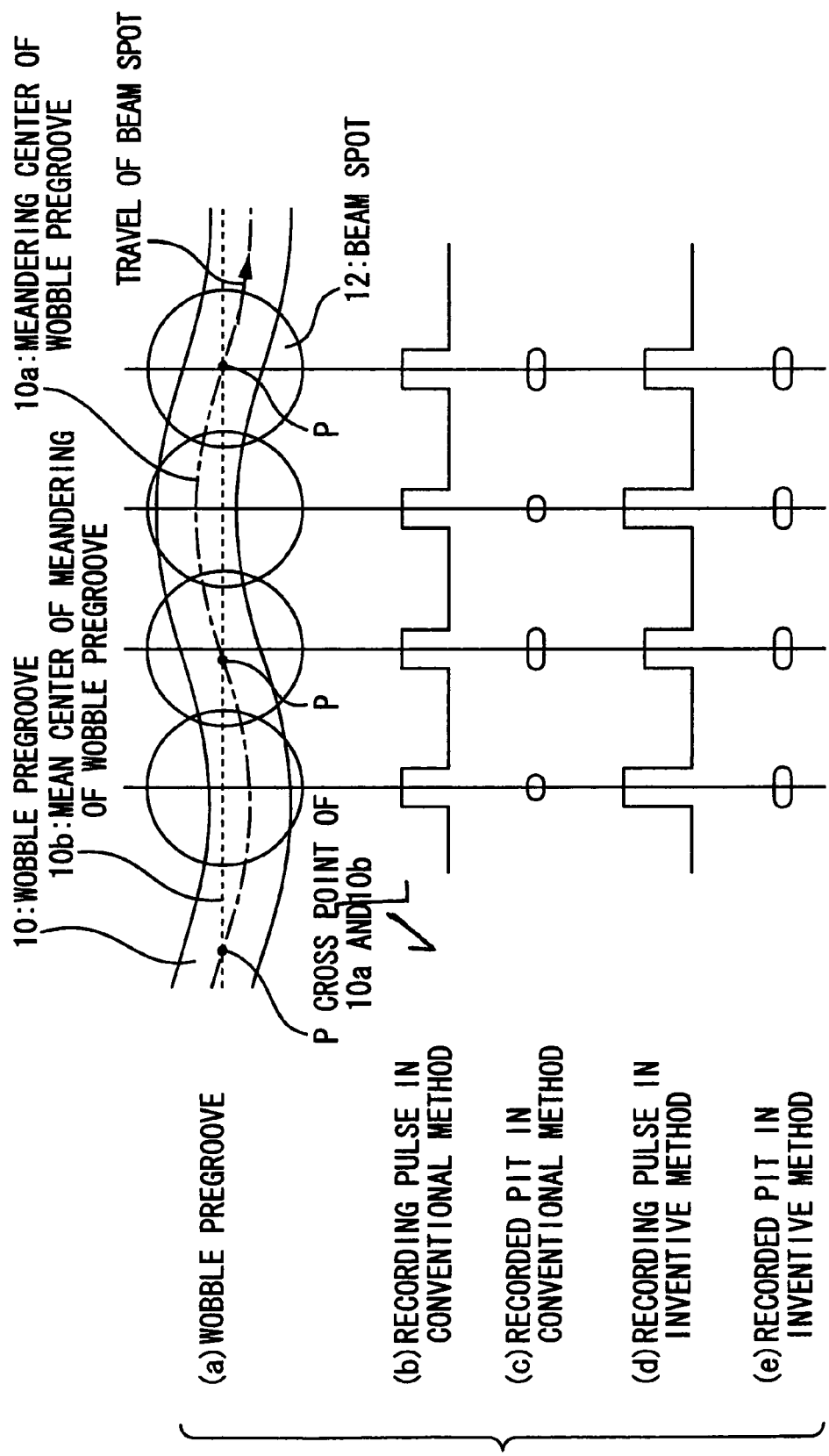
FIG. 16 is an operation waveform diagram of the optical disc recording and reproducing apparatus in FIG. 15.

Referring to FIG. 16, there are shown operation waveforms during recording with the optical disc recording and reproducing apparatus shown in FIG. 13. FIG. 16($a$) shows tracks of a wobble pregroove 10 and a recording beam spot 12. The beam spot 12 passes through a mean center 10$b$ of meandering of the wobble pregroove 10. Conventionally the recording power has been fixed in recording independently of the phase of the wobble signal WO. Therefore, even if the recording pulse width is fixed as shown in (b), recorded pits have been shorter as the center of the beam spot 12 is further away from the meandering center 10$a$ of the meandering of the wobble pregroove 10 as shown in (c). In contrast, in the optical disc recording and reproducing apparatus shown in FIG. 13, the recording power is increased in recording as the center of the beam spot 12 is further away from the meandering center 10$a$ of the wobble pregroove 10 as shown in (d). Namely, the optical beam is controlled such as to increase the power of the optical beam when the spot is positioned where the mean center line 10$b$ of meandering of the wobble pregroove 10 deviates from the meandering center line 10$a$ of the wobble pregroove 10 as compared to the power of the optical beam when the spot is positioned at the cross point P where the mean center line 10$b$ of meandering of the wobble pregroove 10 crosses with the meandering center line 10$a$ of the wobble pregroove 10. Consequently, the power of the optical beam is alternately increased and decreased at a frequency twice as high as a frequency of the wobbling of the wobble pregroove. This enables a formation of pits having a fixed length as shown in (e) when the recording pulse width is fixed as shown in (d).

Fourth Embodiment

Figure 17:
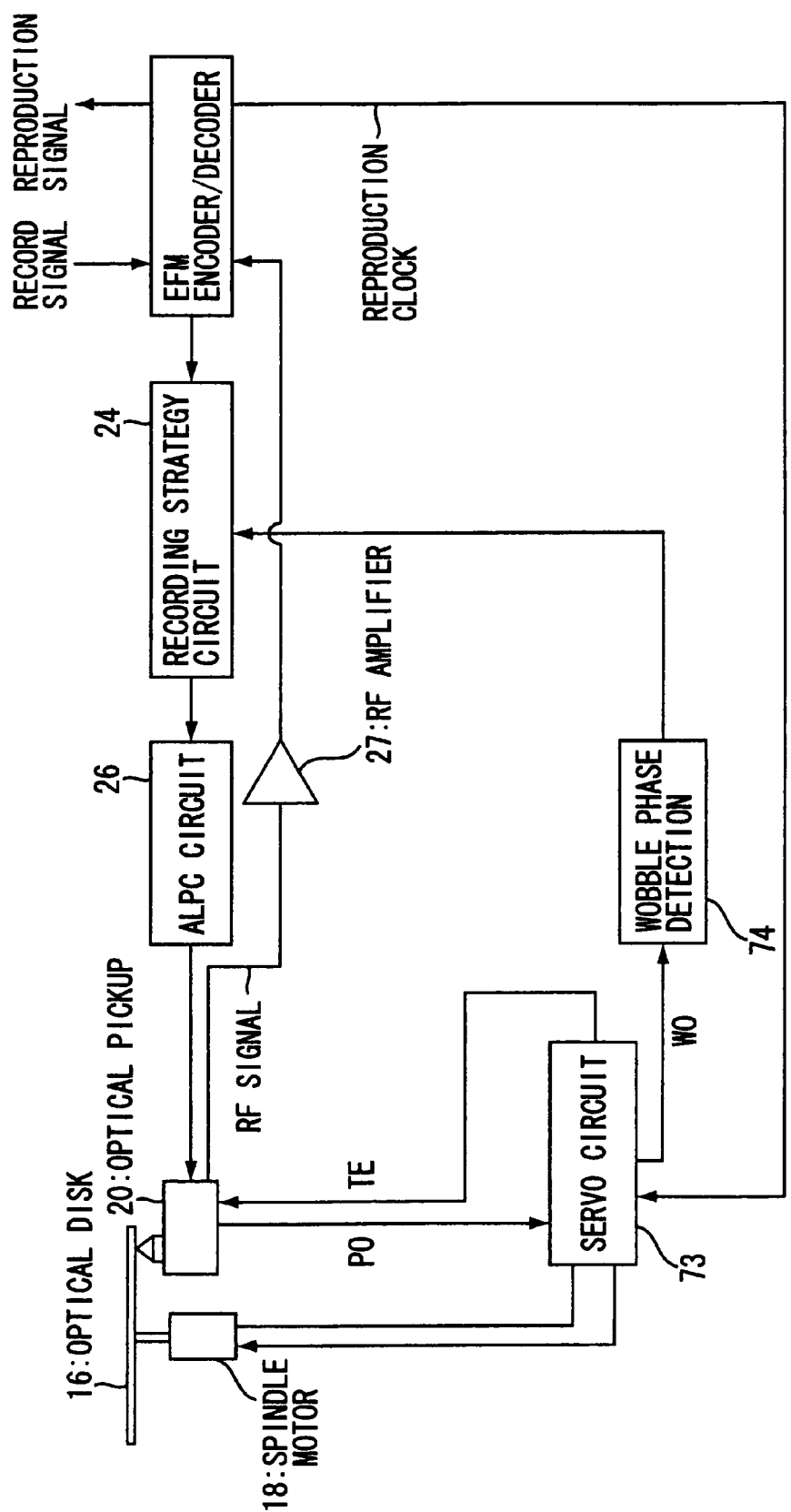
FIG. 17 is a control block diagram of an optical disc recording and reproducing apparatus according to a fourth embodiment of the present invention.

A fourth embodiment of the present invention will be described hereinafter. In the recording operation of this embodiment, pits are recorded along a mean center of meandering of a wobble pregroove by causing a recording beam spot to follow the mean center of the meandering of the wobble pregroove. The recording signal is adjusted such as to increase the pulse width when the spot is positioned where the mean center line of meandering of the wobble pregroove deviates from the meandering center line of the wobble pregroove as compared to the pulse width when the spot is positioned where the mean center line of meandering of the wobble pregroove crosses with the meandering center line of the wobble pregroove. In the reproducing operation, the reproducing beam spot is controlled to trace the mean center of meandering of the wobble pregroove so as to reproduce the information. Referring to FIG. 17, there is shown a control block of the optical disc recording and reproducing apparatus. The same reference numerals have been used as in FIG. 13 for similar parts or signals. An optical disc 16 is driven by a spindle motor 18, thereby causing an optical pickup 20 to record information. A record signal is EFM-modulated by an EFM encoder/decoder 22 and corrected in a time axis by a recording strategy circuit 24. An ALPC circuit 26 drives a laser source in the optical pickup 20 according to the corrected record signal to record the information on the disc 16. The recording laser power in this process is controlled to a command value by means of the ALPC control. On the other hand, in the reproducing operation, the RF signal outputted from the optical pickup 20 is amplified by the RF amplifier 27 and then EFM-decoded by the EFM encoder/decoder 22, thereby obtaining a reproduction signal.

In both of the recording and reproducing operations, a servo circuit 73 performs a focus control, a tracking control, a feed control, a spindle control, and the like on the basis of a photo-receiving signal PO output from the optical pickup 20. The tracking control is performed on the basis of a tracking error signal TE from which wobble components have been removed. As a result, in the recording operation, the recording beam spot follows the mean center of the meandering of the wobble pregroove, thereby causing pits to be recorded along the mean center of the meandering of the wobble pregroove. On the other hand, in the reproducing operation, the reproducing beam spot is controlled to trace the mean center of meandering of the wobble pregroove.

In the recording operation, the servo circuit 73 detects a wobble signal WO on the basis of the photo-receiving signal PO and controls the spindle motor 18 so that the wobble signal WO is detected at a given wobble frequency (22.05 kHz for recording at 1× speed, 44.1 kHz for recording at 2× speed, - - -, and n×22.05 kHz for recording at n× speed) for a constant linear velocity control. On the other hand, in the reproducing operation, the servo circuit 71 controls the rotation number of the spindle motor 18 so as to keep the clock signal derived from the RF signal at a predetermined frequency, thereby performing the constant linear velocity control.

A wobble phase detector 74 detects a phase of the wobble signal WO to control a modulation amount of the recording strategy circuit 24. More specifically, since the recording sensitivity decreases as the center of the beam spot is further away from the center of the meandering of the wobble pregroove, the recording pulses are modulated so as to be relatively longer. Referring to FIG. 18, there are shown operation waveforms during recording with the optical disc recording and reproducing apparatus shown in FIG. 17. FIG. 17(a) shows tracks of a wobble pregroove 10 and a recording beam spot 12. The beam spot 12 passes through a mean center 10b of meandering of the wobble pregroove 10. Conventionally, since a modulation amount of recording pulses has not been changed according to a phase of the wobble signal WO, the recording pulse width is uniform as shown in (b) when forming pits having the same length, by which the recorded pits become shorter as the center of the beam spot 12 is further away from the meandering center 10a of the meandering of the wobble pregroove 10. In contrast, in the optical disc recording and reproducing apparatus shown in FIG. 17, the recording pulses are elongated in recording as the center of the beam spot 12 is further away from the meandering center 10a of the wobble pregroove 10 as shown in (d), that is, deviated away from the cross point P where the mean center 10b of meandering crosses with the meandering center 10a of the wobble pregroove. This enables the formation of pits having a constant length as shown in (e).

While the description has been made in the above embodiments for recording on a CD-R disc or a CD-RW disc, the present invention is also applicable to groove recording on various optical discs having a wobble pregroove such as a DVD-R disc and a DVD-RW disc.

What is claimed is:

1. An optical disc recording method of recording information in the form of pits which are formed by irradiating an optical beam along a wobble pregroove of an optical disc under control of a tracking servo loop, the wobble pregroove continuing in a circumferential direction of the optical disc and wobbling in a radial direction of the optical disc such that the wobble pregroove meanders around a mean center line of meandering during the course of continuing in the circumferential direction, the method comprising:

a first step of operating the tracking servo loop so as to control a spot of the optical beam for tracking along the mean center line of meandering of the wobble pregroove;

a second step of adding a signal corresponding to the wobbling of the wobble pregroove to the tracking servo loop, thereby further controlling the spot of the optical beam to trace the meandering center line of the wobble pregroove; and a third step of modulating a power of the optical beam in accordance with the information to be recorded so that the pits are formed along the meandering center line of the wobble pregroove.

2. The optical disc recording method according to claim 1, wherein the first step comprises detecting a tracking error signal representative of an error of the tracking of the spot based on a photo-receiving signal of the optical beam reflected back from the optical disc, and operating the tracking servo loop according to the detected tracking error signal so that the spot of the optical beam follows the mean center line of meandering of the wobble pregroove, and wherein the second step comprises detecting a signal corresponding to the wobbling of the wobble pregroove, and driving a tracking actuator connected to the tracking servo loop so that the spot of the optical beam traces the meandering center line of the wobble pregroove.

3. An optical disc recording apparatus for recording information in the form of pits which are formed by irradiating an optical beam from an optical pickup along a wobble pregroove of an optical disc, the wobble pregroove continuing in a circumferential direction of the optical disc and wobbling in a radial direction of the optical disc such that the wobble pregroove meanders around a mean center line of meandering during the course of continuing in the circumferential direction, the apparatus comprising:

a tracking actuator that actuates the optical pickup for tracking a spot of the optical beam relative to the wobble pregroove;

a tracking servo loop circuit operative in response to an tracking error signal for controlling the tracking actuator to allow the spot of the optical beam to generally follow the wobble pregroove, the tracking error signal representing an error of the tracking of the spot relative to the wobble pregroove and which is detected from a photo-receiving signal of the optical beam reflected back from the optical disc;

a driver for driving the tracking actuator to control the spot of the optical beam to trace a meandering, center line of the wobble pregroove based on a signal which corresponds to the wobbling of the wobble signal and which is detected from the photo-receiving signal of the optical beam reflected back from the optical disc; and a modulator that modulates a power of the optical beam in accordance with the information to be recorded so that the pits are formed along the meandering center line of the wobble pregroove.

4. An optical disc reproducing method of reproducing information by irradiating an optical beam to form pits along a wobble pregroove of an optical disc, the wobble pregroove continuing in a circumferential direction of the optical disc and wobbling in a radial direction of the optical disc such that a center line of the wobble pregroove meanders during the course of continuing in the circumferential direction, the method comprising the steps of:

tracking a spot of the optical beam along the meandering center line of the wobble pregroove; and reproducing the information based on a photo-receiving signal of the optical beam reflected back from the wobble pregroove formed with the pits, wherein the step of tracking comprises detecting a tracking error signal representative of an error of the tracking of the spot based on the photo-receiving signal of the optical beam reflected back from the optical disc, controlling a tracking servo loop according to the detected tracking error signal so that the spot of the optical beam follows the mean center line of meandering of the wobble pregroove, detecting a signal corresponding to the wobbling of the wobble pregroove based on the photo-receiving signal of the optical beam reflected back from the optical disc, and driving a tracking actuator coupled to the tracking servo loop so that the spot of the optical beam traces the meandering center line of the wobble pregroove.

5. An optical disc reproducing apparatus for reproducing information from pits formed in a wobble pregroove of an optical disc by irradiating an optical beam from an optical pickup to the wobble pregroove, the wobble pregroove continuing in a circumferential direction of the optical disc and wobbling in a radial direction of the optical disc such that the wobble pregroove meanders around a mean center line of meandering during the course of continuing in the circumferential direction, the apparatus comprising:

a tracking actuator that actuates the optical pickup for tracking a spot of the optical beam relative to the wobble pregroove;

a tracking servo loop circuit operative in response to an tracking error signal for controlling the tracking actuator to allow the spot of the optical beam to generally follow the wobble pregroove, the tracking error signal representing an error of the tracking of the spot relative to the wobble pregroove and which is detected from a photo-receiving signal of the optical beam reflected back from the optical disc;

a driver for driving the tracking actuator to control the spot of the optical beam to trace the meandering of the wobble pregroove based on a signal which corresponds to the wobbling of the wobble signal and which is detected from the photo-receiving signal of the optical beam reflected back from the optical disc; and an encoder that reproduces the information based on the photo-receiving signal of the optical beam reflected back from the wobble pregroove formed with the pits.

\* \* \* \* \*